April 9, 1929.  W. L. PROSS, JR  1,708,522
TOASTER
Filed Sept. 27, 1927   2 Sheets-Sheet 2
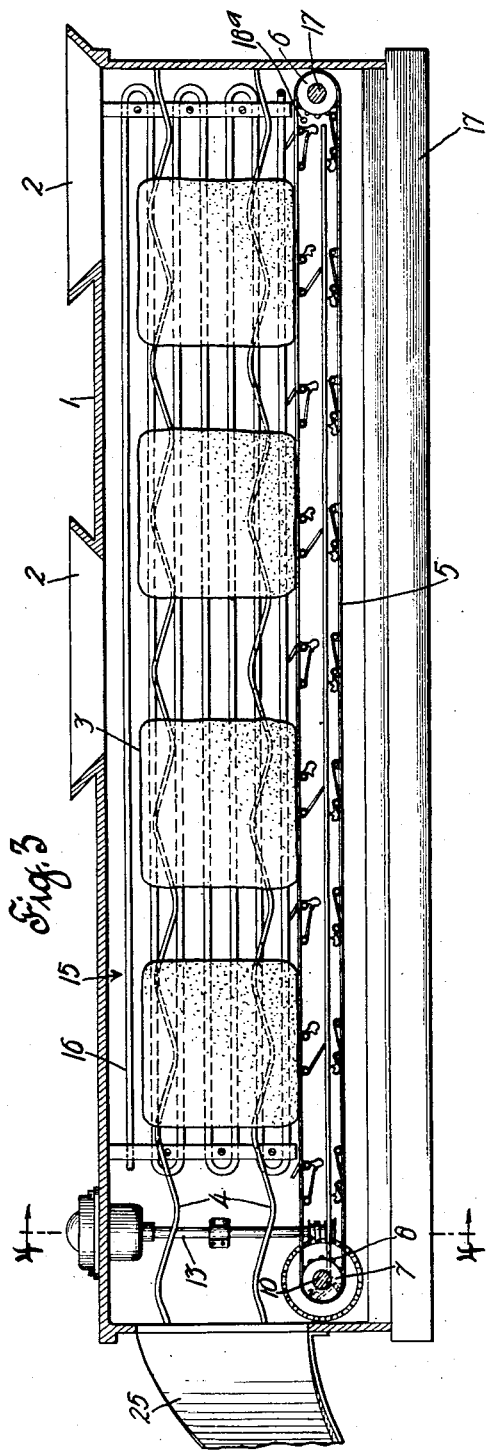
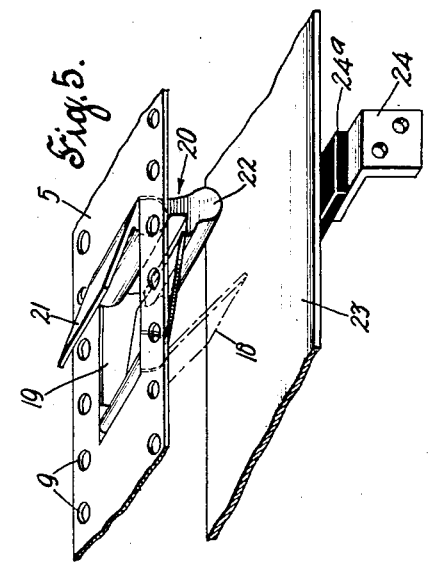
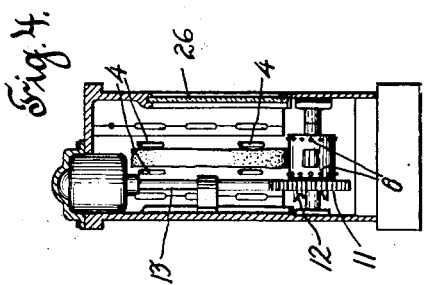
INVENTOR.
William L. Pross Jr.
BY
ATTORNEYS.

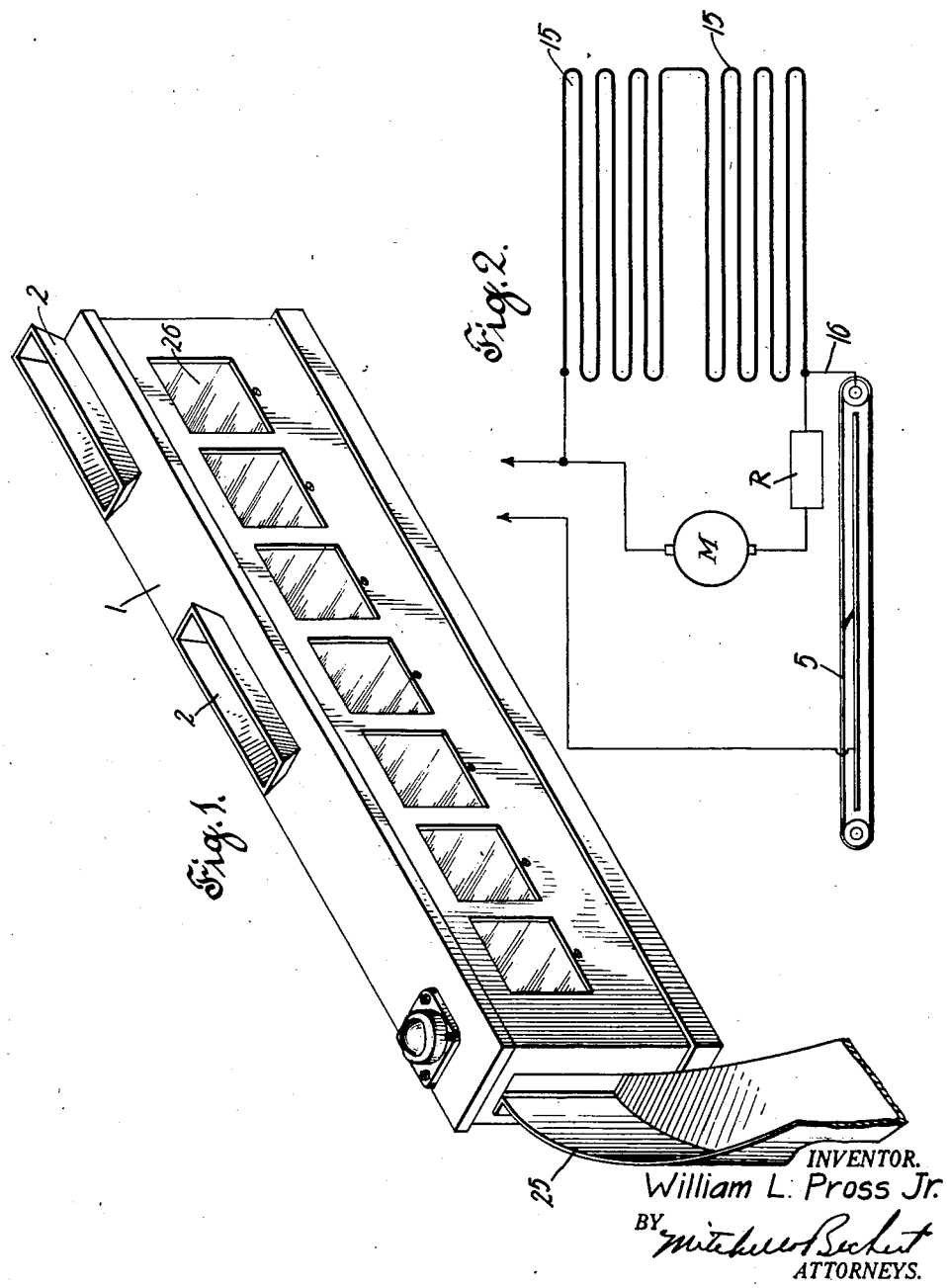

Patented Apr. 9, 1929.

1,708,522

UNITED STATES PATENT OFFICE.

WILLIAM L. PROSS, JR., OF DANBURY, CONNECTICUT, ASSIGNOR TO WILLIAM L. PROSS, OF DANBURY, CONNECTICUT.

TOASTER.

Application filed September 27, 1927. Serial No. 222,254.

My invention relates to toasters and an important object of the present invention is to provide a toaster efficient and economical in operation and of such simplicity of structure as to admit of ready and economical manufacture.

Other objects of the invention relate to the provision of a toaster in which the articles to be toasted, such as slices of bread, are fed through the apparatus by suitable conveying means; a toaster in which the heating of the heating elements is started by insertion of the material to be toasted; a toaster having conveying means for the material to be toasted and means for driving or stopping said conveyer in accordance with the presence or absence of the toaster of material to be toasted; a toaster having heating means, a conveyer for carrying the material past said heating means and means to vary the toasting action; a toaster having a conveyer for carrying slices of bread or the like past heating means and a casing having insertion openings at different positions along the conveyer so that the length of path travelled by the bread in passing the heating means may be varied to vary the toasting effect thereon; a toaster having a conveyer operated by an electric motor, electrical heating means past which the material to be toasted is carried by said conveyer and connected in parallel with said motor and means for varying the current through said motor and said heating means to regulate the toasting effect; and a toaster having a conveyer for carrying bread past the heating means and a casing having portions through which the bread may be observed.

Other objects and advantages will hereinafter appear.

In the drawings which show, for illustrative purposes only, a preferred form of the invention—

Fig. 1 is an isometric view illustrating the illustrative embodiment of the invention as seen from the front;

Fig. 2 is a diagram illustrating the electric system and the manner of closing the circuit through the heating units and the motor;

Fig. 3 is a longitudinal sectional view of the structure shown in Fig. 1;

Fig. 4 is a section on the line 4—4 of Fig. 3; and

Fig. 5 is a fragmentary view on an enlarged scale illustrating a circuit closing device.

In said drawings, 1 indicates the casing of the toaster which is provided at its top with hoppers or guides 2, through which articles 3, such as slices of bread or sandwiches may be inserted to pass downwardly between guides 4 until they rest on the upper reach of a conveyer belt 5, supported on rotatable cages 6 and 7 provided adjacent their edges with teeth or pins 8 adapted to engage in openings 9 spaced at equal intervals along the edges of the conveyer belt 5. The cage 7 at the outlet end of the toaster is mounted on a shaft 10 which is driven by means of a worm gear 11 mounted thereon and meshing with a worm 12 carried by a shaft 13 of an electric motor M.

The actual heating or toasting of the bread or other material is effected by heating elements 15 arranged at opposite sides of the path of the articles to be toasted and consisting of wires 16 extending back and forth longitudinally of the toaster and of sufficient resistance to produce a required heating effect. As seen in Fig. 2 the heating elements 15 are in series with each other and in parallel with the motor M, and one wire 16 of the circuit through the motor and the heating elements 15 is electrically connected with the conveyer belt 5, which is of conductive material, preferably through the shaft 17 on which the right-hand cage or gear 6 is fixed and through which the electric connection with the conveyer belt 5 is made.

As seen most clearly in Figs. 3 and 5, the conveyer belt is provided at suitable intervals with contact members 18 transversely pivoted thereto at the leading edges of openings 19 in the belt. At the opposite edges of the openings 19 are pivoted members 20 having flaps 21 arranged to be positioned at the outer side of the conveyer belt 5 and heavy hook portions 22 at the inside of the belt including shoulders to engage the members or flaps 18 and hold them above a plane conductor member 23 positioned between the upper and lower reaches of the conveyer belt 5. During the operation of the device, the members 18 and 20 are, throughout their travel along the path of the lower reach of the belt, in their ineffective positions (Fig. 3), but when they pass upwardly around the cage or gear 6, each contact member 18 may be supported, for example, by engagement at an edge thereof, projecting beyond the edge of the corresponding member 20 (Fig. 5), with a pin 18ª until the heavy hook portion 23 of the associated member 20 swings into position to engage and hold the contact member 18 in raised position as seen at the right of Fig. 3.

When, however, an article 3, such as a slice of bread, is lowered through one of the hoppers 2 and engages the flap 21 of a member or device 20, the member 20 is swung counterclockwise as seen in Fig. 5 and the corresponding contact member 18 is released and drops into engagement with the conductor 23 which, while supported by the frame by means including a bracket 24 is insulated therefrom by insulating material 24ª, as illustrated in Fig. 5, and is connected to the other side of the control circuit. As soon as one of the contact members 18 engages with the member 23, the circuit through the motor M and the resistance elements 15 is completed and the conveyer belt 5 is driven to feed the toast through the casing 1 while being toasted by the elements 15 and along the curved outlet or chute 25. In order that the condition at the interior of the toaster and the condition of the bread or other material in the toaster may be observed as it passes therethrough, there are provided in the front wall of the toaster windows 26 of glass or other suitable material. Preferably the casing is made of aluminum although, of course, any other suitable material may be used.

When the toaster is used continuously the parts become quite hot and, if the guides 4 extended in straight lines longitudinally of the casing, the toast where brought into contact therewith would be marked by straight lines of browned or burned material. To avoid such marking, the guide members 4 are shaped so as to extend along lines other than straight lines passing from one end of the toaster to the other, such guide members being preferably wavy as illustrated clearly in Fig. 3.

It should be noted that the provision of a plurality of hoppers or openings 2 at the top of the casing and spaced therealong makes it possible to vary the time during which the slices of bread are subjected to the heat of the heating units. For example, a slice placed in the right hand hopper Fig. 3 will take longer to pass through the toaster than a slice placed in the second hopper and will therefore be subjected to heat longer. Thus in starting to use the toaster when cold it might be necessary to insert the bread at the first hopper, whereas after the toaster becomes heated it might be desirable to insert the bread at the second hopper. The degree of browning the toast at any time might also be regulated by inserting the bread in another hopper than the one previously used. The toasting effect may also be varied by means such as a rheostat or adjustable resistance R (Fig. 2) preferably in the motor branch of the circuit. When greater heating is required, the motor may be slowed down by increasing the resistance in that portion of the circuit containing the motor, the current through the heating elements 15 remaining the same. The toasting effect may also be decreased by decreasing the resistance through R, thus increasing the speed of the motor the current through element 15 remaining the same.

It should be understood that various changes may be made in the construction and arrangement of parts without departing from the true spirit and scope of the invention.

I claim:

1. In a toaster, means for feeding slices of material through said toaster, and means actuated by insertion of a slice into said toaster for starting said feeding means.

2. In a toaster, means for feeding slices edgewise through said toaster, and means actuated by insertion of a slice into said toaster for starting said feeding means and adapted to stop the feeding means when the toaster is emptied.

3. In a toaster, heating devices to toast opposite sides of slices to be toasted, and means actuated by insertion of such slices for rendering said heating devices effective thereon.

4. In a toaster, electrically operable means for conveying slices of bread to be toasted through said toaster, and circuit closing means operable by insertion of such slices into the toaster for starting said conveying means.

5. In a toaster, motor-operated means for conveying bread through said toaster, electric heating means past which said bread is conveyed, and circuit closing means operable by insertion of said bread for passing current through the circuit of said motor-operated means and through said heating means.

6. In a toaster for bread and the like, heating elements between which the bread is toasted, means including a conveyer belt to carry bread between and past said heating elements, a motor for driving said conveyer belt, and closing means for the circuit of said motor operable by placing a piece of bread to be toasted on said conveyer belt.

7. A toaster including a conveyer belt to advances slices of bread placed on edge thereon and extending longitudinally thereof, heating means past which the slices of bread are carried by the conveyor, and a casing enclosing said conveyer and heating means and having insertion openings arranged at intervals along the top of the casing to enable variation of the distance travelled through the toaster by slices being toasted.

8. A toaster including a conveyer belt to advance slices of bread placed on edge thereon and extending longitudinally thereof, heating means past which the slices of bread are carried by the conveyer, and a casing enclosing said conveyer and heating means and having insertion openings arranged at intervals along the top of the casing to enable variation of the distance travelled through the toaster by slices being toasted and observation windows at the side.

9. In a toaster, means for advancing edgewise flat slices of bread to be toasted, heating means between which said slices are moved by said advancing means, guiding members in planes at opposite sides of the path of said pieces but of waved form in said planes to avoid longitudinal straight line markings on the toast, and electrical means for actuating said conveyer and heating said heating means and including circuit closing means operable by insertion of a slice of bread through any one of said insertion openings.

10. A toaster including a conveyer belt for advancing slices of bread placed on edge thereon, electric heating elements at opposite sides of the path of the bread on the conveyer, a motor for operating said conveyer, and circuit closing means for controlling said motor and said heating elements including a conductor between the reaches of said conveyer belt, contact elements pivoted at their forward edges at the inner face of said belt so that they may rest on said conductor and maintain the circuit closed condition until drawn off the end of said conductor, latching devices for holding said pivoted contact elements in ineffective position over said conductor but adapted to be released by placing a slice of bread on the conveyer at that point and means to restore said contact elements to control by said latching devices as they pass from the lower to the upper reach of the belt.

11. A toaster including a conveyer belt to carry through the toaster slices of bread placed on edge on said belt and extending longitudinally thereof, heating means past which the slices of bread are carried by the conveyer, and a casing enclosing said conveyer and heating means and having provisions whereby the toasting effect on said slices may be varied.

WILLIAM L. PROSS, JR.